US 10,029,529 B2

(12) United States Patent
Macnamara et al.

(10) Patent No.: US 10,029,529 B2
(45) Date of Patent: Jul. 24, 2018

(54) APPARATUS AND METHOD FOR DETERMINING LOAD WEIGHT

(71) Applicant: Bendix Commercial Vehicle Systems LLC, Elyria, OH (US)

(72) Inventors: Joseph M. Macnamara, Ashland, OH (US); Jon D. Intagliata, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 60 days.

(21) Appl. No.: 15/361,709

(22) Filed: Nov. 28, 2016

(65) Prior Publication Data

US 2018/0147905 A1 May 31, 2018

(51) Int. Cl.
*B60G 11/27* (2006.01)
*B60G 5/02* (2006.01)
*B60G 11/30* (2006.01)
*B60G 21/10* (2006.01)

(52) U.S. Cl.
CPC ............ *B60G 11/27* (2013.01); *B60G 5/025* (2013.01); *B60G 11/30* (2013.01); *B60G 21/10* (2013.01); *B60G 2204/8304* (2013.01); *B60G 2300/0262* (2013.01); *B60G 2400/51222* (2013.01); *B60G 2400/60* (2013.01); *B60G 2400/61* (2013.01); *B60G 2500/202* (2013.01); *B60G 2800/012* (2013.01); *B60G 2800/22* (2013.01)

(58) Field of Classification Search
CPC ........ B60G 11/27; B60G 11/30; B60G 21/10; B60G 5/025; B60G 2400/51222; B60G 2400/61; B60G 2400/60; B60G 2800/22; B60G 2800/012; B60G 2300/0262; B60G 2500/202; B60G 2204/8304
See application file for complete search history.

(56) References Cited

U.S. PATENT DOCUMENTS

| 4,854,407 | A | * | 8/1989 | Wagner | B62D 53/068 177/1 |
| 5,416,706 | A | * | 5/1995 | Hagenbuch | G01G 19/08 177/136 |
| 5,631,832 | A | * | 5/1997 | Hagenbuch | G01G 19/08 340/989 |

(Continued)

FOREIGN PATENT DOCUMENTS

| AU | 2005211687 B2 | 6/2007 |
| CN | 204459744 U | 7/2015 |

(Continued)

*Primary Examiner* — Drew J Brown
(74) *Attorney, Agent, or Firm* — Brian E. Kondas; Cheryl L Grenly; Eugene E. Clair

(57) ABSTRACT

A controller for determining a load weight associated with a plurality of pneumatically independent circuits of a vehicle suspension system is adapted to identify each of the respective pneumatically independent circuits, in turn, as a currently selected one of the pneumatically independent circuits, measure a respective pneumatic pressure of the currently selected one of the pneumatically independent circuits, determine a calculated pneumatic pressure based on the respective measured pneumatic pressures of the pneumatically independent circuits, determine the load weight based on the calculated pneumatic pressure, and control an operation of a function of an associated vehicle based on the load weight.

20 Claims, 2 Drawing Sheets

(56) References Cited

U.S. PATENT DOCUMENTS

| | | | |
|---|---|---|---|
| 6,173,974 B1* | 1/2001 | Raad | B60G 17/017 280/5.514 |
| 7,240,911 B1 | 7/2007 | Escalante | |
| 7,976,040 B2 | 7/2011 | Stahl | |
| 8,360,451 B2 | 1/2013 | Hammond | |
| 9,238,392 B2 | 1/2016 | Geiger et al. | |
| 9,272,599 B1 | 3/2016 | Cook, Jr. et al. | |
| 2002/0038193 A1* | 3/2002 | Grunberg | B60G 11/27 702/173 |
| 2003/0155164 A1* | 8/2003 | Mantini | B60G 17/005 280/149.2 |
| 2006/0170168 A1* | 8/2006 | Rotz | B60G 17/0155 280/5.501 |
| 2007/0017715 A1* | 1/2007 | McCann | B62D 53/068 180/24.02 |
| 2007/0296173 A1* | 12/2007 | Regnell | B60G 17/0152 280/124.1 |
| 2008/0185549 A1 | 8/2008 | Steinbuchel et al. | |
| 2008/0224428 A1 | 9/2008 | Smith et al. | |
| 2009/0206570 A1* | 8/2009 | Strong | B62D 61/12 280/86.5 |
| 2013/0234411 A1 | 9/2013 | Hapyuk | |
| 2015/0197133 A1 | 7/2015 | VanRaaphorst | |

FOREIGN PATENT DOCUMENTS

| | | |
|---|---|---|
| CN | 103802630 B | 12/2015 |
| NZ | 562844 A | 12/2009 |
| WO | 2005090104 A1 | 9/2005 |

* cited by examiner

APPARATUS AND METHOD FOR DETERMINING LOAD WEIGHT

BACKGROUND

The present invention relates to determining a load weight of a vehicle. It finds particular application in conjunction with independent pneumatic circuits and will be described with particular reference thereto. It will be appreciated, however, that the invention is also amenable to other applications.

A typical Trailer Roll Stability Program (TRSP) measures air pressure on an air suspension and converts the pressure reading to a load percentage, and even to an interpreted weight, based on a single pressure input, which is either integrated via a port on the TRSP valve or with an external electrically connected pressure sensor. Since air-bags in an air suspension are typically all pneumatically connected, the air pressure in any one air bag is representative of the pressure of the entire air bag circuit. The leveling or height control valve allows air in or out of the air suspension circuit based on the load placed on the suspension. A height control valve activates based on both vehicle empty sprung weight and payload added or removed to/from the vehicle. The pressure in any one air bag typically does not vary much from any other air bag in the system, which comes to equilibrium within a relatively short amount of time. The air bags along with electronic filtering act to give a stable signal from a pressure measurement perspective. From a TRSP perspective a single measurement is adequate to interpret the load on the trailer.

Some air suspension systems have multiple independently controlled pneumatic circuits that don't equilibrate to a single pressure. One example of such an independently controlled pneumatic system is a dual-circuit pneumatic system having independent circuits on respective sides of a vehicle. Other examples of such systems have independently controlled pneumatic circuits for respective vehicle axles or even individual air bags.

From a TRSP perspective, since pneumatic pressure in one of the circuits may not match the pneumatic pressure(s) in the other circuit(s), multi-circuit pneumatic circuits for air bag suspension control systems may be problematic. More specifically, there is not a single pneumatic pressure on which the load percentage or interpreted weight may be based.

The present invention provides a new and improved apparatus and method for determining a load weight.

SUMMARY

In one aspect of the present invention, it is contemplated that a controller for determining a load weight associated with a plurality of pneumatically independent circuits of a vehicle suspension system is adapted to identify each of the respective pneumatically independent circuits, in turn, as a currently selected one of the pneumatically independent circuits, measure a respective pneumatic pressure of the currently selected one of the pneumatically independent circuits, determine a calculated pneumatic pressure based on the respective measured pneumatic pressures of the pneumatically independent circuits, determine the load weight based on the calculated pneumatic pressure, and control an operation of a function of an associated vehicle based on the load weight.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
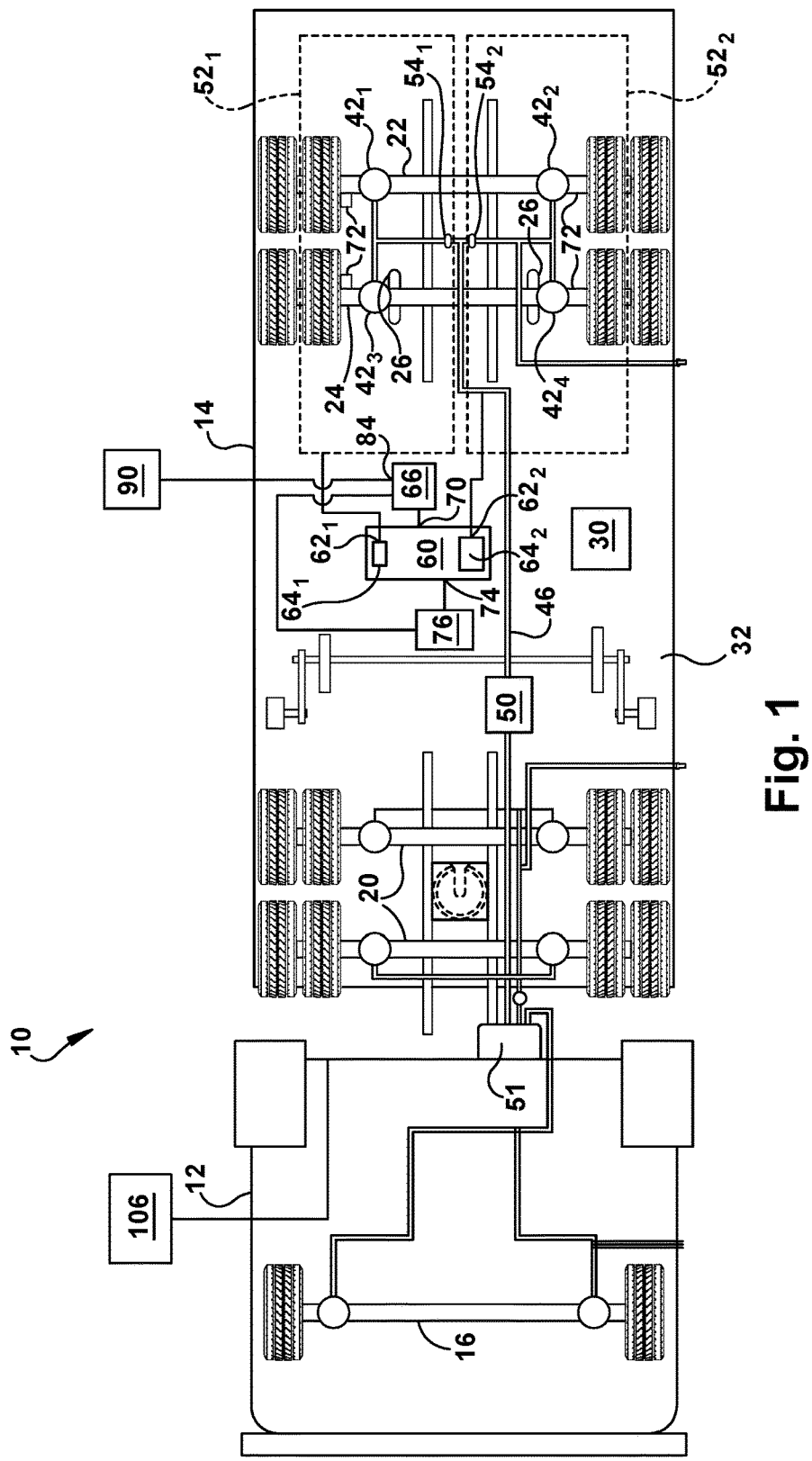
FIG. 1 illustrates a schematic representation of an exemplary system for determining a load weight associated with a plurality of pneumatically independent circuits of a vehicle suspension system in accordance with one embodiment of an apparatus illustrating principles of the present invention.

With reference to FIG. 1, a schematic representation of an exemplary system for determining a load weight associated with a plurality of pneumatically independent circuits of a vehicle suspension system is illustrated in accordance with one embodiment of the present invention. A vehicle 10 includes a towing portion 12 (e.g., a tractor) and a towed portion 14 (e.g., a trailer).

The tractor 12 is removably coupled to the trailer 14. The tractor 12 includes a tractor steer axle 16 and a tractor drive axle 20. In the illustrated embodiment, two (2) rear axles collectively comprise the tractor drive axle 20.

The trailer 14 includes a trailer stationary axle 22 and a trailer lift axle 24. Although only one (1) trailer stationary axle 22 is shown in the illustrated embodiment, it is to be understood that other arrangements including other numbers of axles or groups of axles are contemplated in other embodiments.

At least one lift air bag 26 (e.g., bellow) is deflated/inflated to set a position (e.g., a height) of the trailer lift axle 24 based on, for example, a weight of a load 30 (e.g., a load weight) on a bed 32 of the trailer 14. Although, for purposes of illustration, the load 30 is only illustrated as a small package on one side of the trailer bed 32, it is to be understood that the load 30 may be any size and on one side, the other side, or both sides (either evenly or unevenly) of the trailer bed 32. In one example, the height of the trailer lift axle 24 moves between a maximum height (e.g., fully retracted) position and a minimum height (e.g., fully extended) position. The trailer lift axle 24 is biased by a spring, for example, to the maximum height. Therefore, to set the height of the trailer lift axle 24 to the maximum height (e.g., fully retracted) position, the at least one lift bag 26 is substantially fully inflated. Conversely, to set the height of the trailer lift axle 24 to the minimum height (e.g., fully extended) position, the at least one lift bag 26 is substantially fully deflated to overcome the bias of the spring associated with the trailer lift axle 24. In the fully retracted position, the height is the distance (e.g., six (6) inches) between a surface of the road on which the vehicle 10 is traveling and a tire associated with the trailer lift axle 24 when the at least one lift bag 26 is substantially fully inflated. In the fully extended position, the height is zero (0) feet off of the road surface (since the tire associated with the trailer lift axle 24 is travelling on the road surface). It is to be understood that any height of the trailer lift axle 24 between the maximum height and the minimum height is achieved by partially deflating/inflating the at least one lift bag 26.

The trailer 14 includes an air-ride suspension that includes at least two (e.g., four (4)) suspension air bags $42_1$, $42_2$, $42_3$, $42_4$ (collectively 42). The suspension air bags 42 are part of a vehicle suspension system and are supplied with air through a pneumatic line 46 (e.g., air line), which extends from an air reservoir 50 (e.g., tank) mounted to the trailer 14. It is to be understood the tank 50 receives pneumatic fluid from a source (e.g., a reservoir 51) on the tractor 12. The air-ride suspension system typically includes an air leveler, which is known in the art.

When the trailer lift axle 24 is at the minimum height (e.g., fully extended), the suspension air bags $42_1$, $42_3$ fluidly communicate with each other and are part of a first pneumatic circuit $52_1$. The suspension air bags $42_2$, $42_4$ fluidly communicate with each other and are part of a second pneumatic circuit $52_2$. The first and second pneumatic circuits $52_1$, $52_2$ (collectively 52) are fluidly independent (e.g., isolated) from each other. Therefore, although the suspension air bags 42 are supplied with air through the pneumatic line 46, first and second height control valves $54_1$, $54_2$ (collectively 54) fluidly isolates the suspension air bags $42_1$, $42_3$ from the suspension air bags $42_2$, $42_4$, thereby creating the respective independent (e.g., isolated) pneumatic circuits $52_1$, $52_2$.

When the trailer lift axle 24 is at the maximum height (e.g., fully retracted), the first pneumatic circuit $52_1$ only includes the suspension air bag $42_1$ and the second pneumatic circuit $52_2$ only includes the suspension air bag $42_2$. For purposes of the below discussion, it is assumed that the trailer lift axle 24 is at the minimum height (e.g., fully extended) so that the first pneumatic circuit $52_1$ includes both the suspension air bag $42_1$, $42_3$ and the second pneumatic circuit $52_2$ includes both the suspension air bag $42_2$, $42_4$.

The respective pressures in the pneumatic circuits 52 are based on and represent the weight of the load 30 (i.e., the load weight) on the bed 32 of the trailer 14.

A multiplexer 60 includes a plurality of pneumatic inputs $62_1$, $62_2$ (collectively 62) (e.g., two (2)) that fluidly and independently communicate with the pneumatic circuits $52_1$, $52_2$, respectively. It is contemplated that the pneumatic inputs 62 include respective valves $64_1$, $64_2$ (collectively 64). Since the illustrated embodiment includes two (2) of the pneumatic circuits $52_1$, $52_2$, the multiplexer 60 is illustrated as including the two (2) pneumatic inputs $62_1$, $62_2$ and, consequently, two of the valves $64_1$, $64_2$. It is to be understood that the multiplexer 60 is contemplated to include a number of the pneumatic inputs 62 and valves 64 corresponding to the number of pneumatic circuits 52.

An electronic control unit (ECU) 66 (e.g., a controller) electrically communicates with an electronic control port 70 of the multiplexer 60. In one embodiment, the ECU 66 is part of an automated braking system of the vehicle 10, which controls a plurality of brakes 72.

The ECU 66 transmits control signals to the electronic control port 70 for controlling the multiplexer 60. For example, the ECU 66 is adapted to identify each of the respective pneumatically independent circuits 52, in turn (e.g., cyclically), as a currently selected one of the pneumatically independent circuits 52. The ECU 66 transmits control signals to the electronic control port 70 for causing the respective pneumatic input 62 of the currently selected pneumatically independent circuit 52 to fluidly communicate with a pneumatic output 74 of the multiplexer 60. For example, the ECU 66 transmits control signals to the electronic control port 70 for causing the respective valve 64 of the pneumatic input 62 of the currently selected pneumatically independent circuit 52 to open/close so that the pneumatic input 62 of the currently selected pneumatically independent circuit 52 either fluidly communicates with, or is fluidly isolated from, the pneumatic output 74. The respective valves 64 of the pneumatic inputs 62 of the pneumatically independent circuits 52 that are not currently selected remain closed so that the respective pneumatic inputs 62 of the pneumatically independent circuits 52 that are not currently selected are fluidly isolated from the pneumatic output 74. It is to be understood that the ECU 66 transmits control signals to the electronic control port 70 for independently controlling the valves 64.

The pneumatic output 74 of the multiplexer 60 fluidly communicates with a pressure sensor 76. The pressure sensor 76 measures the pneumatic pressure in the currently selected pneumatic circuit 52 and generates electronic signals representing the pressure in the currently selected pneumatic circuit 52. The ECU 66 electronically communicates with the pressure sensor 76 and receives the signals from the pressure sensor 76 that represent the pressure in the currently selected pneumatic circuit 52.

The ECU 66 is also adapted to determine a calculated pneumatic pressure based on the respective measured pneumatic pressures of the pneumatically independent circuits 52. In one embodiment, the ECU 66 determines the calculated pneumatic pressure by calculating an average of the pneumatic pressures in the various pneumatic circuits 52. In other embodiments, the ECU 66 is also adapted to determine the calculated pneumatic pressure based on the highest of the respective measured pneumatic pressures of the pneumatically independent circuits 52, the lowest of the respective measured pneumatic pressures of the pneumatically independent circuits 52 or any other computation involving the measured pneumatic pressures of the pneumatically independent circuits 52. It is contemplated that the ECU 66 determines the calculated pneumatic pressure after the ECU 66 separately identifies each of the respective pneumatically independent circuits 52, in turn.

As discussed above, the ECU 66 separately identifies each of the respective pneumatically independent circuits 52, in turn. In one example, the ECU 66 independently selects each of the pneumatically independent circuits 52 one at a time, and once each of the pneumatically independent circuits 52 has been selected, begins again. In other words, the ECU 66 cycles through each of the pneumatically independent circuits 52, where one cycle includes independently selecting each of the pneumatically independent circuits 52 one time, and measuring pressure in the selected pneumatically independent circuit 52, until each of the pneumatically independent circuits 52 has been selected once.

The ECU 66 is also adapted to determine the weight of the load 30 (i.e., the load weight) on the bed 32 of the trailer 14. It is also contemplated that the ECU 66 is also adapted to determine the respective weights supported by each of the pneumatically independent circuits 52 and thus determine and report load distribution on the bed 32 of the trailer 14. Therefore, the ECU 66 is capable of comparing weights associated with each of the pneumatically independent circuits 52 and identify a variation between the weights above a predetermined threshold variation and report as an imbalanced load on the bed 32 of the trailer 14. For example, the ECU 66 determines a first percentage of the load 30 is supported by the first pneumatically independent circuit $52_1$ and a second percentage of the load 30 is supported by the second pneumatically independent circuit $52_2$, where the first and second percentages add to 100 percent of the load 30.

It is to be understood that although only two (2) independent pneumatic circuits 52 are illustrated, any number of independent pneumatic circuits greater than two (2) are also contemplated. In addition, although each of the two (2) independent pneumatic circuits 52 are illustrated as including two (2) suspension air bags, it is to be understood that either of the independent pneumatic circuits 52 may include one (1) or more suspension air bags. In addition, although each of the two (2) independent pneumatic circuits 52 are illustrated as including the same number of suspension air bags, it is contemplated that independent pneumatic circuits may include different numbers of suspension air bags.

The pneumatic pressure calculated by the ECU 66 based on the respective measured pneumatic pressures of the pneumatically independent circuits 52 represents the weight of the load 30 (i.e., the load weight) on the bed 32 of the trailer 14. Therefore, the pneumatic pressure calculated by the ECU 66 is a single value representative of the respective pressures in the pneumatic circuits 52 and the weight of the load 30 on the bed 32 of the trailer 14.

In addition, the ECU 66 determines the load weight based on the calculated pneumatic pressure. In one embodiment, the load weight is linearly related to the calculated pneumatic pressure. Therefore, the load weight is determined as:

$y = mx + b$, where:

y=Load Weight (pounds);
x=Calculated Pneumatic Pressure (pounds per square inch (psi));
m=Slope; and
b=Constant based on how the ECU 66 determines the calculated pressure based on the respective pressures of the pneumatically independent circuits 52.

In one embodiment, the slope (m) is provided by the manufacturer of the suspension with the air bags 42 on the vehicle trailer 14. For purposes of discussion, the slope (m) is assumed to be a constant.

An operation of a function of the vehicle 10 is controlled based on the load weight (y). It is contemplated that the vehicle function is at least one of a roll stability function (e.g., a trailer roll stability function), an antilock braking function, a lift axle control (e.g., lift axle) function, a load imbalance reporting function, a load distribution reporting function, etc. If the function is the roll stability function, the controller 66 is adapted to control the operation of the roll stability function by setting a threshold of a parameter, based on the load weight, at which an automated braking associated with the roll stability function occurs.

In one embodiment, the parameter is a lateral acceleration of the vehicle 10. In this case, the controller 66 is adapted to control the operation of the roll stability function by decreasing (e.g., linearly decreasing) the threshold of the lateral acceleration (e.g., the parameter) at which the automated braking occurs as the load weight increases. In other words, the automated braking is initiated with relatively lower lateral acceleration and, therefore, is said to be more sensitive to lateral acceleration of the vehicle 10. Conversely, the controller 66 is adapted to control the operation of the roll stability function by increasing (e.g., linearly increasing) the threshold of the lateral acceleration (e.g., the parameter) at which the automated braking occurs as the load weight decreases.

In one example, the controller 66 is adapted to linearly decrease the lateral acceleration threshold at which the automated braking occurs from about 4.0 m/s$^2$ at a load weight of about 20% of a maximum rated load weight of the vehicle 10 to about 2.5 m/s$^2$ at a load weight of about 80% of a maximum rated load weight of the vehicle 10.

The controller 66 is adapted to transmit an electrical load weight signal and/or an electrical load balance signal from an ECU electrical output 84. In one embodiment, the electrical load weight signal is transmitted to a device 90 for displaying and/or recording the load weight. For example, the electrical load weight signal may be transmitted to the device 90 electrically connected to the ECU electrical output 84. In another example, the electrical load weight signal may be transmitted as a power line carrier signal to a device 106 in the tractor 12. It is also contemplated that the electrical load weight signal may be wirelessly transmitted from the ECU 66, the device 90 and/or the device 106.

The controller 66 is also capable of receiving an electronic lift axle height signal at a controller input from the trailer lift axle 24. It is contemplated that the electronic lift axle height signal is received at an ECU electrical input port. The lift axle height signal indicates a current height of the trailer lift axle 24.

The controller 66 determines a desired height of the trailer lift axle 24 based on the load weight. For example, if the load weight is at least a predetermined threshold, it is determined that the trailer lift axle 24 should be in the fully extended position. Or, if the load weight is not at least a predetermined threshold, it is determined that the trailer lift axle 24 should be in the fully retracted position.

If the lift axle height signal indicates the trailer lift axle 24 is not within a predetermined range (e.g., 6 inches) of the desired position, the controller 66 transmits a signal for setting the trailer lift axle 24 to within the predetermined range of the desired position. Although the trailer lift axle 24 is only described as being in the fully retracted or fully extended position, it is to be understood any height between these positions is also contemplated.

Figure 2:
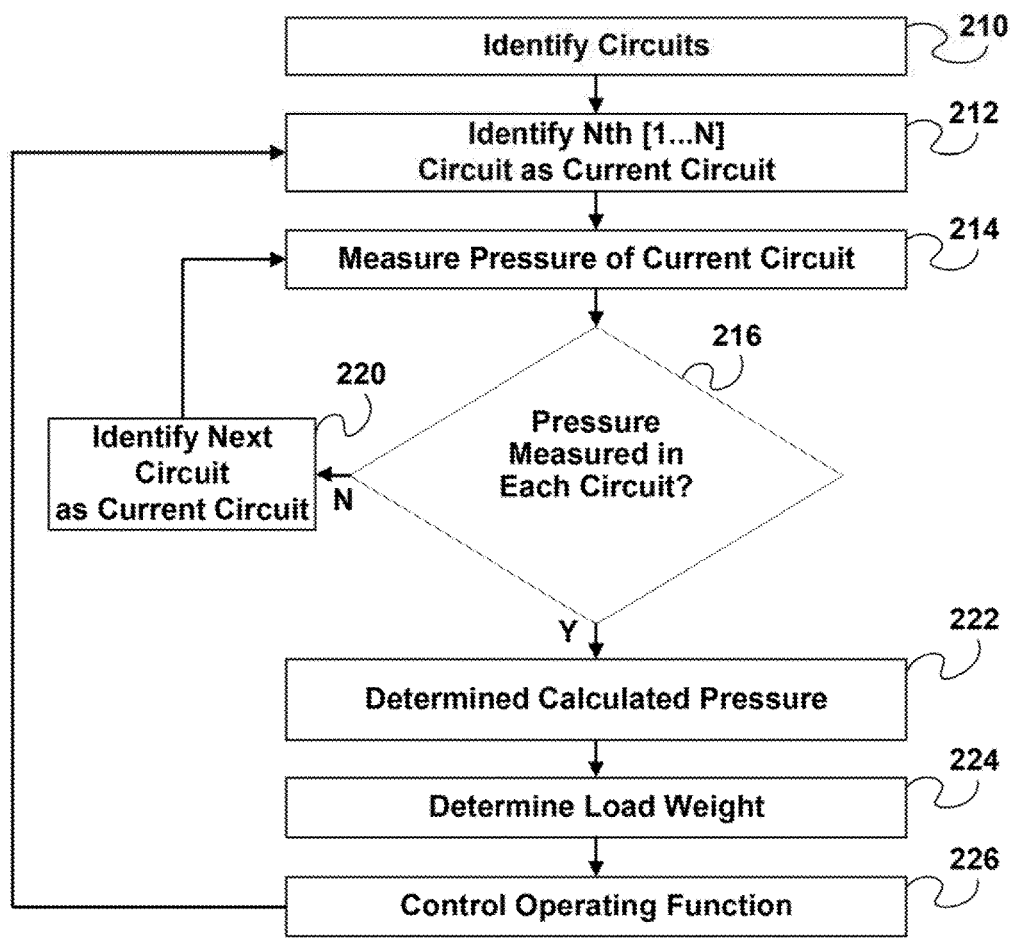
FIG. 2 is an exemplary methodology of determining a load weight in accordance with one embodiment illustrating principles of the present invention.

With reference to FIG. 2, an exemplary methodology of the system shown in FIG. 1 for determining a load weight is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, the ECU 66 identifies each of the pneumatically independent circuits 52 in a step 210. In a step 212, a first of the pneumatically independent circuits 52 is identified as a currently selected one of the pneumatically independent circuits 52. The pneumatic pressure of the currently selected pneumatically independent circuit 52 is measured in a step 214. A determination is made, in a step 216, whether the pneumatic pressure in each of the pneumatically independent circuits 52 has been measured during the current cycle. If it is determined in the step 216 that the respective pressure in each of the pneumatically independent circuits 52 has not been measured during the current cycle, control passes to a step 220 for identifying the next of the pneumatically independent circuits 52 as the currently selected one of the pneumatically independent circuits 52 before returning to the step 214.

If, on the other hand, it is determined in the step 216 that the respective pressures in each of the pneumatically independent circuits 52 has been measured during the current cycle, control passes to a step 222 for determining the calculated pneumatic pressure, based on the respective measured pneumatic pressures of the pneumatically independent circuits 52. As discussed above, there are different ways of calculating pneumatic pressure in the step 222 including, for example, calculating the average pneumatic pressure from all of the pneumatically independent circuits 52.

Then, in a step 224, the load weight is determined based on the calculated pneumatic pressure. The operation of the function is controlled, based on the load weight, in a step 226. For example, the operation of the roll stability function is controlled in the step 226 by setting the threshold of the parameter (e.g., lateral acceleration) as discussed above.

Control then returns to the step 212.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for determining a load weight associated with a plurality of pneumatically independent circuits of a vehicle suspension system, the controller adapted to:
   identify each of the respective pneumatically independent circuits, in turn, as a currently selected one of the pneumatically independent circuits;
   measure a respective pneumatic pressure of the currently selected one of the pneumatically independent circuits;
   determine a calculated pneumatic pressure based on the respective measured pneumatic pressures of the pneumatically independent circuits;
   determine the load weight based on the calculated pneumatic pressure; and
   control an operation of a function of an associated vehicle based on the load weight.

2. The controller for determining a load weight as set forth in claim 1, the controller further adapted to:
   determine the calculated pneumatic pressure as an average of the respective measured pneumatic pressures of the pneumatically independent circuits.

3. The controller for determining a load weight as set forth in claim 1, the controller further adapted to:
   determine the calculated pneumatic pressure after measuring the respective pneumatic pressures in each of the pneumatically independent circuits.

4. The controller for determining a load weight as set forth in claim 1, wherein:
   the function is at least one of a roll stability function, an antilock braking function, a lift axle function, a load imbalance reporting function and a load distribution reporting function.

5. The controller for determining a load weight as set forth in claim 4, wherein the function is a roll stability function, the controller further adapted to:
   control the operation of the roll stability function by setting a threshold of a parameter, based on the load weight, at which an automated braking associated with the roll stability function occurs.

6. The controller for determining a load weight as set forth in claim 5, the controller further adapted to:
   decrease the threshold of the parameter at which the automated braking occurs as the load weight increases.

7. The controller for determining a load weight as set forth in claim 6, wherein:
   the parameter is a lateral acceleration of the associated vehicle.

8. The controller for determining a load weight as set forth in claim 6, the controller further adapted to:
   linearly decrease the threshold of the parameter at which the automated braking occurs as the load weight increases.

9. The controller for determining a load weight as set forth in claim 8, the controller further adapted to:
   linearly decrease the threshold of the parameter at which the automated braking occurs from about 4.0 m/s$^2$ at a load weight of about 20% of a maximum rated load weight of the associated vehicle to about 2.5 m/s$^2$ at a load weight of about 80% of a maximum rated load weight of the associated vehicle.

10. The controller for determining a load weight as set forth in claim 1, the controller further adapted to:
    independently control each of the plurality of respective valves, in turn, to fluidly communicate the currently selected one of the pneumatically independent circuits with a pressure sensor while the other pneumatically independent circuits are fluidly isolated from the pressure sensor, the pressure sensor measuring the respective pneumatic pressure of the currently selected one of the pneumatically independent circuits.

11. A vehicle system, comprising:
    a plurality of pneumatically independent circuits of an associated suspension system;
    an automated braking system including a plurality of respective automatically controlled brakes; and
    a controller for controlling the operation of the automated braking system, the controller adapted to:
      identify each of the respective pneumatically independent circuits as a currently selected one of the pneumatically independent circuits;
      measure a respective pneumatic pressure of the currently selected one of the pneumatically independent circuits;
      determine a calculated pneumatic pressure based on the respective measured pneumatic pressures of the pneumatically independent circuits;
      determine the load weight based on the calculated pneumatic pressure; and
      control an operation of a function of an associated vehicle based on the load weight.

12. The system as set forth in claim 11, the controller further adapted to:
    cyclically identify each of the respective pneumatically independent circuits as the currently selected one before repeating the cycle.

13. The system as set forth in claim 12, the controller further adapted to:
    determine the calculated pneumatic pressure after each of the cycles.

14. The system as set forth in claim 12, the controller further adapted to:
    determine the load weight as an average of the respective calculated pneumatic pressures identified during a single cycle.

15. The system as set forth in claim 11, the controller further adapted to:
    control the operation of the automated braking system by setting a threshold of a lateral acceleration of a roll stability function, based on the load weight, at which the automated braking system engages.

16. A method for controlling an operation of a function of an associated vehicle, the method comprising:
identifying each of a plurality of respective pneumatically independent circuits, in turn, as a currently selected one of the pneumatically independent circuits;
measuring a respective pneumatic pressure of the currently selected one of the pneumatically independent circuits;
determining a calculated pneumatic pressure based on the respective measured pneumatic pressures of the pneumatically independent circuits;
determining the load weight based on the calculated pneumatic pressure; and
controlling an operation of a function of an associated vehicle based on the load weight.

17. The method for controlling an operation of a function of an associated vehicle as set forth in claim 16, wherein the determining step includes:
determining the calculated pneumatic pressure as an average of the respective measured pneumatic pressures of the pneumatically independent circuits.

18. The method for controlling an operation of a function of an associated vehicle as set forth in claim 16, wherein:
the controlling step includes:
controlling a roll stability function of the associated vehicle based on the load weight;
the method further includes:
controlling the operation of the roll stability function by setting a threshold of a parameter, based on the load weight, at which an automated braking associated with the roll stability function occurs.

19. The method for controlling an operation of a function of an associated vehicle as set forth in claim 18, wherein setting a threshold of a parameter includes:
setting the threshold of a lateral acceleration of the associated vehicle.

20. The method for controlling an operation of a function of an associated vehicle as set forth in claim 19, further including:
linearly decreasing the threshold of the later acceleration at which the automated braking occurs from about 4.0 m/s$^2$ at a load weight of about 20% of a maximum rated load weight of the associated vehicle to about 2.5 m/s$^2$ at a load weight of about 80% of a maximum rated load weight of the associated vehicle.

* * * * *